UNITED STATES PATENT OFFICE.

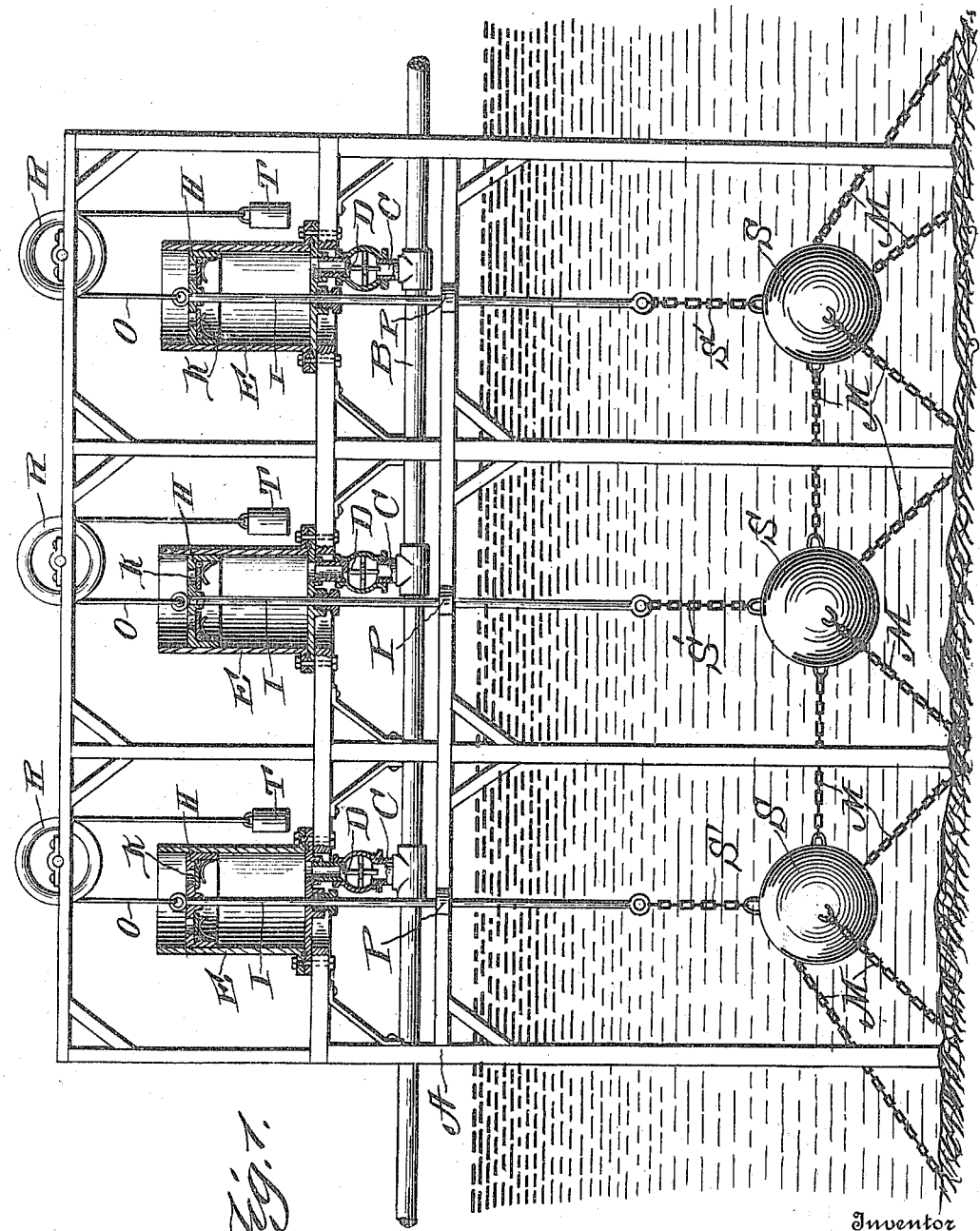

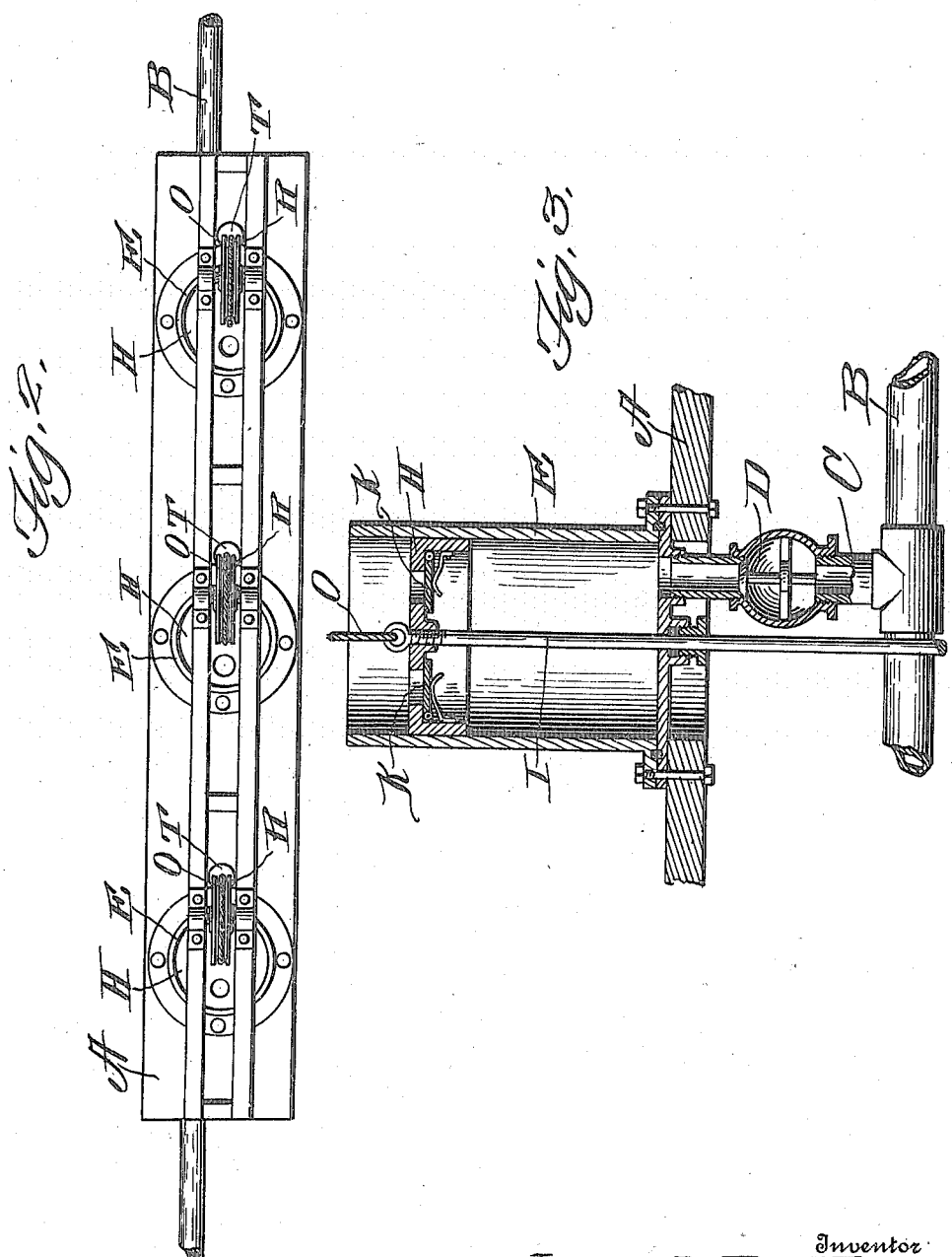

LEMUEL D. WOODS, OF BOSTON, MASSACHUSETTS.

WAVE-POWER APPARATUS FOR COMPRESSING AIR.

1,264,737.  Specification of Letters Patent.  Patented Apr. 30, 1918.

Application filed December 3, 1917.  Serial No. 205,111.

*To all whom it may concern:*

Be it known that LEMUEL D. WOODS, a citizen of the United States, residing at Boston, in the county of Suffolk and State of Massachusetts, has invented certain new and useful Improvements in Wave-Power Apparatus for Compressing Air; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wave power apparatus for compressing air and consists of a simple and efficient means for utilizing wave power for compressing air for various purposes, and consists of further details of construction, combinations and arrangements of parts which will be hereinafter fully described, shown in the accompanying drawings and then defined specifically in the appended claim.

My invention is illustrated in the accompanying drawings which with the letters of reference marked thereon, form a part of this specification and in which:

Figure 1 is an elevation of my invention, Fig. 2 is a top plan view, and

Fig. 3 is an enlarged detail view parts being shown in section.

Reference now being had to the details of the drawings by letters:

A designates a suitable frame work which is securely anchored in the bottom of the bed of the ocean, and B is a pipe line having branches C therefrom communicating with the various cylinders E in which air is to be compressed. Each pipe C is provided with a valve D, permitting air to make exit from the cylinder E. H is a piston mounted one in each cylinder and having a piston rod I fixed thereto, which passes through a suitably packed opening in the lower end of the cylinder and is provided with intake air valves K, opening inwardly, permitting air to enter the cylinder on the up-stroke, and closing on the down-stroke of the piston. A cable O is fastened to the upper end of each piston and passes about a pulley R and has a weight T secured to its end. Floats, designated by letter S, are connected, each through the medium of the chain S' with the lower end of a piston rod which is guided by the member P through which they pass. The buoys are held so as to have an up and down movement as nearly in alinement with the cylinders as possible through the medium of the guide ropes or chains M fastened at points diametrically opposite to the floats and anchored at their other ends to the bottom of the ocean.

In the drawings I have shown three floats, but it will be understood that any number may be employed. By utilizing more a greater power will be produced.

In operation, as the floats are raised by the water the weights will cause the pistons to be drawn up, the valves in the latter opening to permit air to enter the cylinders. As the wave recedes the buoy which is considerably heavier than the weight will cause the pistons to be drawn down and compress the air within the cylinder, forcing the same through the valves into the pipe line B. This operation of alternately raising and lowering the piston will cause a supply of compressed air to be forced through the pipe to be utilized for any purpose desired.

What I claim to be new is:

A wave power apparatus for compressing air comprising a frame work having upright posts with cross pieces, compressed air cylinders mounted upon said posts, a conveyer pipe with valve connections with said cylinder, a piston rod movable through a suitably packed gland in the bottom of the cylinder and guided in a bearing in the frame, a valved piston fixed to said rod, a weighted cable fastened to the upper end of said rod and a pulley over which the cable passes, a float and chains anchoring the same to the beams of the frame and to the earth, a linked chain pivotally connecting the float with the lower end of said rod.

In testimony whereof I hereunto affix my signature in presence of two witnesses.

LEMUEL D. WOODS.

Witnesses:
WILLIAM J. BARRY,
THERESA MAGNUSON.

Copies of this patent may be obtained for five cents each, by addressing the "Commissioner of Patents, Washington, D. C."